Oct. 10, 1961 A. T. NORDSIECK 3,003,356
FREE-GYRO SYSTEMS FOR NAVIGATION OR THE LIKE
Filed Nov. 1, 1954 2 Sheets-Sheet 2

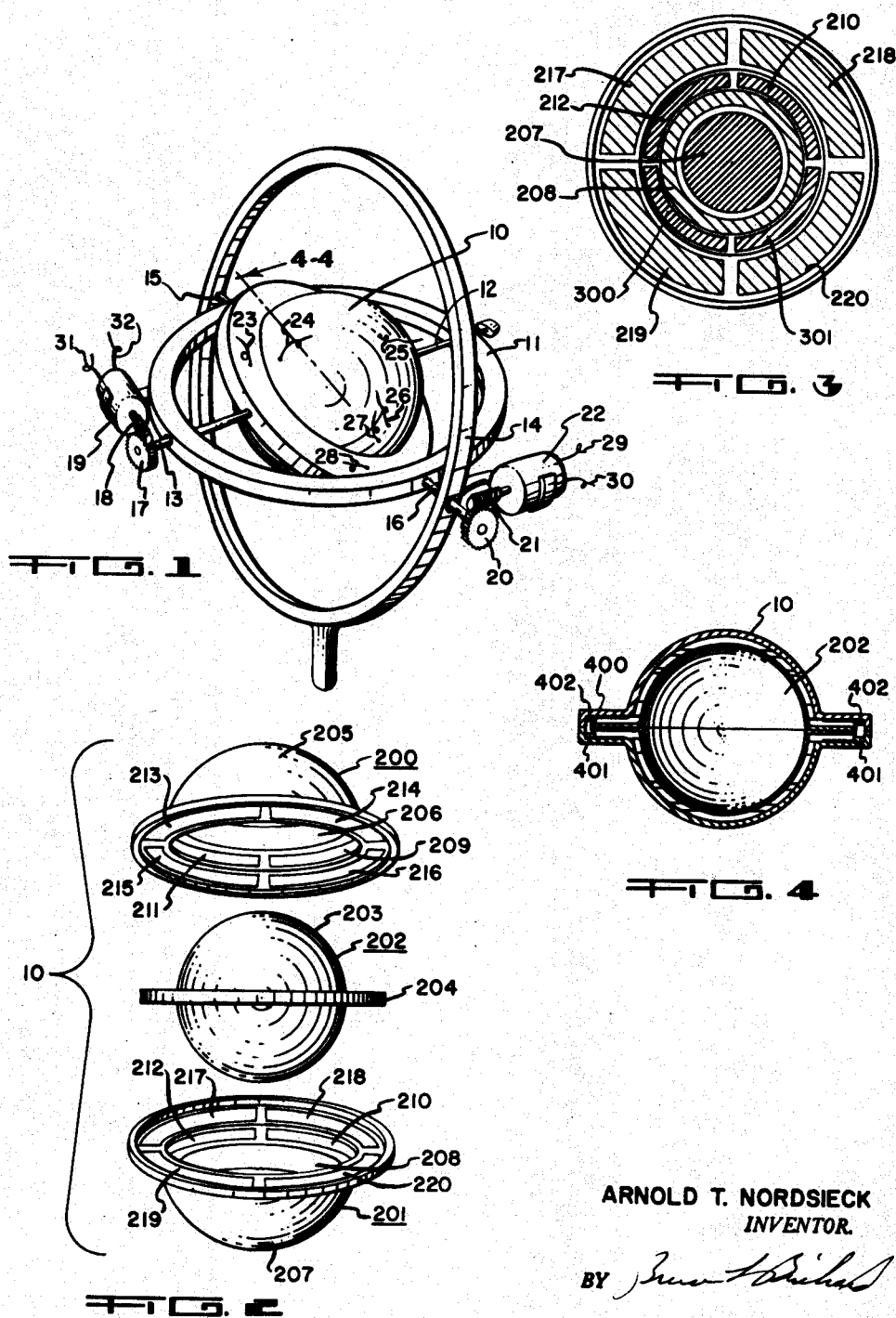

ARNOLD T. NORDSIECK
INVENTOR.

BY *[signature]*

HIS ATTORNEY

United States Patent Office 3,003,356
Patented Oct. 10, 1961

3,003,356
FREE-GYRO SYSTEMS FOR NAVIGATION
OR THE LIKE
Arnold T. Nordsieck, Urbana City, Ill., assignor, by direct and mesne assignments, of two-thirds to Instrument Development & Manufacturing Corporation, a corporation of California, and one-third to Bruce L. Birchard, Los Angeles, Calif.
Filed Nov. 1, 1954, Ser. No. 465,958
12 Claims. (Cl. 74—5)

This invention relates to improvements in navigational systems and, more particularly, to such a system incorporating a practical form of a free running gyroscope, more commonly referred to as a "free-gyro." It has been long recognized that accurate knowledge of two or more appropriately chosen fixed directions in space, plus the knowledge of the local vertical direction and the length of time which has passed since the last determination of position will permit navigational fixes, the accuracy of which will be determined by the accuracy of maintaining those fixed directions in addition to accuracy in the knowledge of the local vertical direction and the time which has passed since the last fix. It has also long been realized that, in principle, the required several fixed directions could be provided by the angular momentum vectors of freely rotating bodies, more commonly referred to as "free-gyros" to distinguish them from gyro-compasses. However, the requirements of freedom from extraneous torques are so severe that this approach has been regarded as technically infeasible up until the present invention. For example, reference is made to the authoritative work by A. L. Rawlings entitled The Gyroscopic Compass, which, at page 16, indicates that a free-gyro system would be the ideal approach but notes that the inaccuracies which arose with the equipment available in the art at the time of the writing of the book made the scheme totally unusable. The major problems arise from varying friction, lack of dynamic balance and the like. These undesirable factors cause parasitic torques and precessional forces which, with the apparatus provided by the prior art, produced errors as high as 5° per day, an intolerable inaccuracy.

Therefore, it is an object of this invention to provide an improved navigational system.

It is a further object of this invention to provide an accurate free-gyro navigational system.

It is a still further object of this invention to provide a gyroscopic element which, in operation, is substantially totally free of parasitic torques and, correspondingly, free of self-generated precessional forces.

It is an additional object of this invention to provide a free-gyro and associated circuitry which will provide a highly accurate long-range navigational aid.

According to the present invention there is provided a free running gyroscope comprising a rotor portion spherical except for a region in the area of the equator of the sphere which supports a disc-like protuberance about the equator of the sphere giving an appearance which is much like the planet Saturn with its associated rings, but geometrically constituting a composite of a sphere and a cylinder, the cylinder being of short axial length. The rotor is enclosed by an envelope of insulating material which bears on its inner surface a series of electrodes to which high electrical potentials may be applied to effect, through well known electrostatic attraction principles, the supporting or levitation of the rotor free of any contact with the inner walls of the envelope. The rotor is made of thin, non-magnetic material of high strength, such as Duraluminum or non-magnetic stainless steel. It is caused to rotate by the application of a rotating magnetic field, much as an induction type of motor is caused to rotate, and upon reaching the proper speed such rotating field is removed. The volume within the envelope is evacuated to reduce drag or friction upon the rotor and to avoid electrical breakdown. A high frequency control signal is applied to the supporting plates through a bridge and, through appropriate circuitry associated with the source of supporting potential, the rotor is maintained equi-distant from the walls of the envelope. Tilt of the rotor is detected by means of high frequency control potentials applied to plates supported within the envelope on areas opposite both sides of the protruding ring-disc portion of the rotor and through appropriate servomechanisms the envelope is tilted so that its axis of symmetry constantly lies along the axis of rotation of the rotor. The deflection of the envelope is then noted. If one such unit and associated circuitry is adjusted so that the axis of rotation of the rotor and the axis of symmetry of the envelope point at the polar star, and hence the rotational and symmetry axes are parallel to the axis of the Earth, latitudes may be determined at any point by simply acquiring additional information as to the true vertical at that point. By utilizing another such free-gyro lying in an East-West direction, azimuthal increments of motion may be determined, assuming chronometric corrections are made for the Earth's rotation. Errors in the free-gyro system contemplated by this invention may be as low as 1' of arc per day or lower, which is equivalent to one nautical mile on the surface of the Earth per day.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of a gyroscopic element and supporting mechanism according to this invention;

FIGURE 2 is an exploded view of the gyroscopic element shown in FIGURE 1;

FIGURE 3 is a top view of the lower shell section of FIGURE 2;

FIGURE 4 is a cross sectional view of the gyroscopic element of FIGURE 1 taken along line 4—4 in FIGURE 1;

Figure 5:
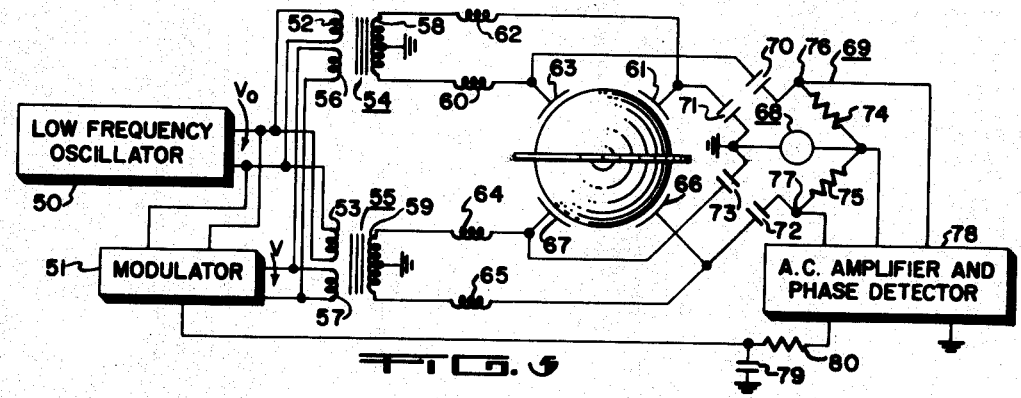
FIGURE 5 is a schematic diagram showing the supporting and controlling elements to be associated with the gyroscopic element of FIGURE 1.

In FIGURE 1, envelope 10 which is of glass or similar insulating material, is supported pivotally in gimbal 11 by means of shafts 12 and 13. Gimbal 11 is supported pivotally in gimbal 14 by means of shafts 15 and 16. The outer extremity of shaft 13 carries pinion 17 in operative engagement with worm 18 driven by motor 19 which is supported on gimbal 11. Pinion 20 is carried on the outer extremity of shaft 16 in operative engagement with worm 21 driven by motor 22 supported on gimbal 14. Lead-in conductors 23, 24, 25, 26, 27 and 28, in addition to other lead-in conductors on the opposite hemisphere and ring are sealed in the walls of envelope 10 and make contact with internal plates or electrodes on the inner wall of envelope 10, these electrodes being more clearly shown in FIGURE 2. Envelope 10 is evacuated to reduce frictional drag in the operation of the device and to reduce electrical breakdown and corona. This will be set forth more clearly in the discussion of FIGURE 2. Appropriate driving voltages may be applied to connectors 29, 30, 31 and 32 on motors 19 and 22.

In FIGURE 2, envelope 10 includes upper shell 200 and lower shell 201 which is made substantially symmetrical to the upper shell. Rotor portion 202 is made of a light diamagnetic material, such as Duraluminum or non-magnetic stainless steel, and includes spherical portion 203 and a substantially flat ring portion 204 lying effectively in the plane of the equator of the sphere portion. Rotor 202 may be hollow and of thin wall section in order to reduce its weight and, hence, to reduce the potential required to support rotor 202 within envelope 10 during operation of the gyroscope. The lower limit for the wall thickness of rotor 202 is dictated by the strength of the material and the speeds at which it is intended the rotor be rotated, since that in turn determines the centrifugal stresses produced. In the subject case, it is contemplated that a rotational speed of 80,000 r.p.m. will meet the requirements of the system.

The inner dimensions of upper shell 200 and lower shell 201 are chosen so that there exists a clearance of substantially .015 inch around the entire contour of rotor 202 during the actual operation of the gyroscope. Pinholes may be provided at the poles of rotor portion 202 in order to permit evacuation of the space inside the rotor as well as that between the rotor and envelope 10.

As has already been indicated, the heart of the gyroscopic element according to this invention is the mechanism for supporting rotor 202 free of any bearings or other sources of friction. This is accomplished in the present invention by establishing an electric field between pairs of electrodes. These electrodes are in proximity to the conductive rotor 202 and that rotor essentially forms a condenser with each of the electrodes. According to the well known laws of electricity, any pair of condenser plates between which a potential gradient or electric field exists are attracted toward one another with a force equal to $E^2/8\pi$ dynes per square centimeter of plate area, where E is the potential gradient or electric field in statvolts per centimeter. In order to avoid any direct electrical contact with rotor 202, a plurality of pairs of electrodes are placed on the inner surface of upper and lower hemispheres 200 and 201 and are positioned adjacent different areas on rotor 202. Connections are made to the two electrodes in each pair with no connection to the rotor, thus forming two condensers in series. Since the rotor must be stabilized in three dimensions, and in any aspect relative to the vertical, it is necessary to supply supporting forces along three mutually perpendicular axes and for each of these forces we must provide two pairs of condensers, each pair diametrically opposite the other because it is possible only to provide attractive and not repulsive forces with the technique described. These supporting electrodes are partially visible in the illustration of FIGURE 2. The exact orientation of the electrodes in each hemisphere 200 and 201 is shown more clearly in FIGURE 3. In FIGURE 2, however, electrodes 205 and 206 constitute one pair of supporting electrodes and are opposed in their action by electrodes 207 and 208 in lower hemisphere 201. Similarly, electrodes 209 and 210 form a second pair of supporting electrodes which are counterbalanced in their effect by a diametrically opposed pair of electrodes, not shown in FIGURE 2. The third set of mutually perpendicular forces is provided by means of electrodes 211 and 212 opposed in their action by a corresponding pair of electrodes disposed on a diametrically opposed portion of envelope 10. These latter electrodes are not shown in FIGURE 2. It is to be noted that the supporting fields act only on the spherical portion of the rotor 202 and all the lines of force will, by basic rules of electrostatics, terminate at the sphere substantially normal to its surface, thus eliminating any parasitic torques which would ultimately cause precessional errors.

In addition to the supporting electrodes just described, envelope 10 carries a plurality of rotor orientation sensing electrodes 213, 214, 215, 216, 217, 218, 219 and 220. As can be seen from FIGURE 2, these electrodes lie along the inner face of envelope 10 opposite the flat sides of ring portion 204 of rotor 202. As will be discussed in connection with FIGURE 6, high frequency potentials of small magnitude are applied to these plates and the plates form arms of bridge circuits so that upon variation in the capacitance presented by pairs of plates the bridge is unbalanced and control voltages may be generated to actuate motors 19 and 22 for orienting envelope 10 so that its axis of symmetry corresponds to the spin axis of rotor 202. In this bridge circuit electrode 215 is paired with electrode 220, electrode 213 is paired with electrode 218, and electrode 214 is paired with electrode 217. Ring 204 constitutes the common plate of a pair of series condensers and any tilting of ring 204 reduces the distance between that ring and at least one of the pairs of electrodes, thus increasing the capacitance of the series combination and unbalancing the associated bridge circuit so that correction voltages are generated. As can be seen from FIGURE 2 and from FIGURE 3, the axis of symmetry of the electrode pattern coincides with the axis of symmetry of the supporting envelope 10. Since the envelope is to be automatically aligned with the rotor 202, the axis of symmetry of the electrode pattern will coincide with that of the rotor within very small angular limits. This is essential for minimizing parasitic torques. The alignment must be held to within 1' of arc or better since the fixed direction in space is not read directly from the orientation of the rotor but, rather, from the orientation of the supporting envelope, and this fixed direction must be read to within 1' of arc.

In FIGURE 3 the pattern of electrode distribution on each hemisphere 200 and 201 is more clearly evident. Since the distribution is identical in the two hemispheres, it will be adequate to discuss only one of such hemispheres. Electrodes which are evident in FIGURE 2 and assigned designations therein have the same designations in FIGURE 3. As has already been indicated, electrodes 207, 208, 210, 212 and electrodes 300 and 301, in combination with their counterparts in the opposing hemispherical section constitute the supporting electrodes of the system. These electrodes may be applied to the inner surface of each hemisphere by an evaporation process, for example. Orientation sensing electrodes 217, 218, 219 and 220 may be applied by a similar technique, as may be their counterparts on the opposing hemispherical section. Appropriate electrode leads may be sealed in the walls of envelope 10 in contact with the various electrodes.

In FIGURE 4 rotor 202 is shown in an operating position within envelope 10. Ring portion 400 of envelope 10 has step rings 401 and 402 of insulating material formed on the inner faces thereof. These step rings may be of the same material from which the envelope itself is formed, as for example glass, but must have an insultating characteristic. Their function is to prevent short circuiting of all the lower electrodes when rotor 202 is in a resting position. This is necessary to permit proper starting and stopping of rotor 202 without damaging the associated controlling and supporting circuits. As has been indicated, the volume within envelope 10, including that within rotor 202, is evacuated to reduce frictional forces arising from gas molecule drag on rotor 202, and, in addition, evacuation is required to minimize ionization and breakdown between the supporting electrodes which are operating at substantially high potentials, for example in the order of 5,000 volts. It is necessary that the rotor 202 be made with a relatively high degree of dynamic balance and, hence, its symmetry must be accurately maintained in its fabrication. A lesser degree of accuracy is required for the formation of the inner surface of envelope 10. As has been indicated earlier, in actual operation rotor 202 is centered within envelope 10 and a spacing of substantially .015 inch may exist around the entire contour of rotor 202 with respect to the inner face of envelope 10.

In FIGURE 5 oscillator 50 is operating at a relatively low frequency, for example 400 cycles, and is operating at a voltage level dependent upon the step-up turns ratio of transformers 54 and 55. The output voltage from oscillator 50 is impressed on primary winding 52 of transformer 54 and with reversed winding connections on primary winding 53 of transformer 55. Modulator 51 provides an additional voltage of controlled magnitude and sense but at the same frequency and phase as that from oscillator 50. The output voltage from modulator 51 is impressed on primary windings 56 and 57 of transformers 54 and 55, respectively, without winding connection reversal. If the fixed voltage obtained directly from oscillator 50 is designated $V_0$ and the additional variable voltage from modulator 51 is designated V, then, as a result of the relative winding connections, there appears across secondary 58 a voltage proportional to $(V_0+V)$ and across secondary 59 a voltage proportional to $(V_0+V)$. The former voltage is applied through decoupling chokes 60 and 62 to electrodes 61 and 63, and may be designated $V_1$. The latter voltage is applied through decoupling chokes 64 and 65 to electrodes 66 and 67, respectively, and may be designated $V_2$. If D.C. supporting potentials are desired, the A.C. potentials appearing across secondaries 58 and 59, respectively, may be rectified by well known means.

Simultaneously, position sensing voltages of high frequency from oscillator 68 are impressed on bridge 69 and, consequently, through by-pass condensers 70, 71, 72 and 73, upon electrodes 63, 61, 66 and 67, respectively. Bridge 69 includes resistors 74 and 75 which form the remaining two arms of the bridge. Output signals from the bridge are taken from junction points 76 and 77 and applied to an A.C. amplifier and phase detector 78 of conventional variety. The output of unit 78 is a D.C. error voltage corresponding to phase variations resulting from unbalance in bridge 69 as rotor 202 shifts closer to the condenser pair comprising electrode 63 and 61 and further from the electrode pair comprising electrode 67 and 66. As explained earlier the pairs of electrodes form condensers in which the rotor is one plate common to both condensers. As has been indicated, a force exists between two plates of a condenser in an amount $$\frac{E^2}{8\pi}$$

dynes per square centimeter of plate area, where E is in statvolts per centimeter. The force produced upon rotor 202 by electrodes 61 and 63 opposes that produced by electrodes 66 and 67, hence the net force on rotor 202 along a line joining the midpoints of the respective electrode pairs may be expressed as $$F=k(V_1^2-V_2^2)$$

or $$F=k([V_0+V]^2-[V_0-V]^2)$$

expanding, $$F=k(V_0^2+2V_0V-V_0^2+2V_0V-V^2)$$

so, $$F=4kV_0V$$

hence, $$F\sim V$$

continuing, $$\Delta F\sim \Delta V$$

but it is desired that $$\Delta V\sim \text{Error signal}$$

therefore, $$\Delta F\sim \text{Error signal}$$

and, consequently, $$F\sim \int \text{Error signal}$$

This relationship assures "memory" for this electrical servo system and is effected by the integrating network comprising condenser 79 and resistor 80 connected to the output of A.C. amplifier and phase detector 78. Thus the control signal applied to modulator 51 is the integral of the error signal from the phase detector. Modulator 51 must have the characteristic of responding to the sign of the integrated error signal as well as to its magnitude. This requirement is common in servo modulators and may be met by any of a number of circuits, some of which are shown at page 381 of the "Electronic Instruments" Volume (Vol. 21) of the Radiation Laboratory Series.

Secondary windings 58 and 59 are center tapped and the center taps are grounded, thus providing a balanced system and effectively placing rotor 202 at ground potential, a condition which minimizes cross-coupling between the three supporting circuits. In view of the fact that transformers 54 and 55 include iron cores, and, hence present high impedances and also high loss characteristics to high frequency signals of the type used for controlling the supporting potentials, chokes 60, 62, 64 and 65 may be superfluous. It should be noted that the description has dealt with the control of potentials on two sets of pairs of electrodes but, as indicated earlier in the specification, it is necessary to establish the proper forces in three mutually perpendicular directions in order to properly determine the positioning of rotor 202. Hence, two additional control circuits of the type just described must be utilized. Electrodes 63, 61, 67 and 66 in FIGURE 5 may be considered as representing any of the diametrically opposed pairs of electrodes illustrated in FIGURES 2 and 3, for example the pair of electrodes including electrodes 207 and 208 and the coacting pair of electrodes 205 and 206, of FIGURE 2.

De-coupling chokes 60, 62, 64 and 65 permit the low frequency supporting potentials to pass to the intended electrodes but prevent the sensing voltage from the high frequency oscillator 68 from being coupled through transformers 54 and 55 to other extraneous points in the circuit where those sensing signals should not appear. Correspondingly, condensers 70, 71, 72 and 73 permit the high frequency sensing signals from oscillator 68 to pass to the appropriate electrodes but prevent a voltage of any appreciable magnitude at the frequency of the supporting voltage oscillator from appearing across bridge 69, thus preventing deleterious effects in bridge 69. The sign of the control signal appearing at the output of unit 78 is chosen so that when rotor 202 is closer to electrodes 61 and 63 than it is to electrodes 66 and 67, hence indicating excessive supporting voltage between electrodes 61 and 63, the output from modulator 51 will be decreased, thus reducing the supporting voltage appearing between electrodes 61 and 63, and, in this case, permitting rotor 202 to fall closer to electrodes 66 and 67. This same analysis may be applied to the use of this circuit in connection with the other sets of pairs of supporting electrodes.

Figure 6:
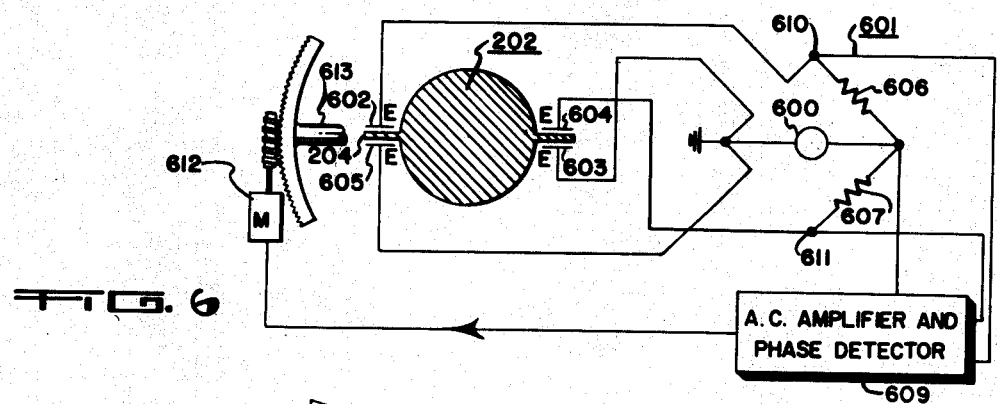
FIGURE 6 is a schematic diagram of the orientation sensing apparatus to accompany the gyroscopic element of FIGURE 1.

In FIGURE 6 there is disclosed the circuit for sensing the orientation or tilt of rotor 202 so that envelope 10 may be rotated to a position with its axis of symmetry coincident with the spin axis of rotor 202. Two such circuits are required to permit the proper orientation of envelope 10. High frequency voltage from oscillator 600 is applied to bridge 601 and, hence, to a first series-parallel condenser combination comprising electrode 602, rotor 204 and electrodes 603 and 605, which forms one arm of bridge 601, and to a second combination comprising electrode 604, rotor 204 and electrodes 603 and 605, forming a second arm of bridge 601. The bridge in addition contains two resistances 606 and 607. A.C. amplifier and phase detector 609, of conventional variety, has two of its input terminals connected between terminals 610 and 611 of bridge 601. A reference signal from oscillator 600 is also fed into the phase detector portion.

A control signal from unit 609 is applied to servomotor 612. An amplifier may be interposed if deemed desirable. This latter portion of the circuit involves well known servo techniques and will not be dwelt upon at length here. Control signals from unit 609 cause motor 612 (which corresponds to either motor 19 or 22 of FIGURE 1) to drive shaft 613 in the appropriate direction so as to orient envelope 10, not shown in this figure, so that its axis of symmetry corresponds to the spin axis of rotor 202. By observing FIGURE 6 it is apparent that if rotor 202 should tilt clockwise around an axis normal to the sheet of paper, the left portion of ring 204 will approach electrode 602 and the right portion of ring 204 will approach electrode 603 thus increasing the total capacitance of the combination while at the same time reducing the total capacitance of the combination including electrode 604, thus unbalancing the bridge and producing a correction signal at the output from unit 609. This same servo system is applied to the remaining four electrodes in the orientation or tilting sensing combination thus correcting the orientation of envelope 10 in a second direction substantially normal to the first direction. With these two sets of correcting systems envelope 10 may properly follow any deviations of rotor 202. A high degree of accuracy in maintaining the relative orientation of the envelope 10 and rotor 202 may be realized by this technique. For example, calculations involving a rotor with a radius of about one inch indicate the possibility of maintaining an accuracy of 1/200' of arc. The frequency of oscillator 600 may be in the range of 1 or 2 megacycles, but it should differ from the frequency of the oscillator 600 used for sensing the displacement of rotor 202 in the process of supporting such rotor in envelope 10.

Figure 7:
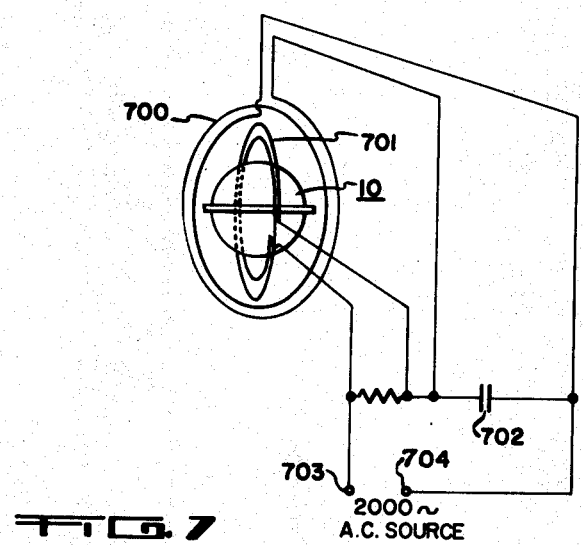
FIGURE 7 is a diagram, partly in schematic form, showing one method for producing operation of the gyroscopic element according to this invention.

In FIGURE 7 there is shown schematically and in simple form a possible approach to applying accelerating fields to rotor 202. The envelope 10 is surrounded by two circular coils 700 and 701 lying in planes perpendicular to each other but containing the axis of envelope 10. These two coils 700 and 701 are fed in phase quadrature, as by adding capacitance 702, from a source of alternating voltage having a frequency in the order of 2,000 cycles per second. A rotating field will be produced which will induce the appropriate eddy currents in rotor 202 and cause it to rotate at a speed somewhat less than a synchronous speed. When the desired rotational speed, approximately 80,000 r.p.m., is reached, the voltage is removed from terminals 703 and 704 leaving rotor 202, not shown in FIGURE 7, free to rotate within envelope 10.

The method for putting the gyroscope into operation is as follows. The envelope and rotor are oriented in a predetermined desired fixed direction, for example parallel to the earth's axis. The rotor is then floated by means of the automatically electrically controlled fields applied to the supporting electrodes 205, 206, 207, 208, 209, 210, 211, 212, 300, 301, etc. Next, by means of coils 700 and 701, a rotating magnetic field is applied to rotor 202, as in an induction motor. As soon as rotor 202 has been brought up to operating speed, which may be in the order of 80,000 r.p.m., the rotating field is removed by shutting off the voltage applied to terminals 703 and 704 and the rotor 202 coasts freely thereafter. In normal operation the angular momentum lost as time passes due to retarding torques will be replenished by activating the rotating field once again for a short period when a new navigational fix is available. In the process of starting rotor 202, it will be lifted off insulating supports 401 and 404 and centered in envelope 10. At this point a problem may arise because the rotor is not yet rotating and has no angular stability. In some cases, it may be necessary to apply some supporting electric fields temporarily to the orientation sensing electrodes 213 through 220, after removing the servo system connections temporarily. Once the rotor 202 has gained some angular momentum, these auxiliary supporting fields are removed and the servo system returns to its normal function of driving motors 19 and 22. When operational speed has been reached, rotor 202 will be constantly maintained in a central location with respect to envelope 10 by reason of the automatic control mechanism described in connection with FIGURE 5 and, as the vehicle upon which the gyroscope system is carried moves, there will be a relative tilting of rotor 202 with respect to envelope 10 and error voltages will be developed in the circuit described in connection with FIGURE 6, causing envelope 10 to be reoriented so as to have its axis of symmetry coincident with the spin axis of rotor 202. Incremental changes in direction may be measured along gimbals 11 and 14. With two such systems initially directed in two desired directions, for example, at right angles to each other, it is possible to maintain a very accurate indication of location with the simple additional expedients of knowing the true vertical and the time since the last fix. Accuracies as high as 1' of arc per day, corresponding to one mile on the surface of the earth, are contemplated. A direct reading on remote instruments as to absolute latitude and longitude is possible by simple telemetering apparatus applied to the basic system disclosed herein.

The use of diamagnetic materials, such as Duraluminum or non-magnetic stainless steel, and the additional use of electrostatic suspension rather than the use of magnetic suspension is dictated by the need for complete freedom from parasitic torques. If there is any ferromagnetic material in the rotor, large parasitic torques may be expected and the accuracy will not be adequate.

Purely by way of example, rotor 202 may be one and one-half inches in diameter and made of Duraluminum with an over-all rotor mass of one-half ounce. Calculations indicate that such a rotor would be able to withstand the forces produced in rotation of the rotor at 80,000 r.p.m. and that a supporting field of 70,000 volts per centimeter or a total supporting potential of 5,200 volts would suffice. The supporting electric field figure is based on using 80% of the spherical surface area for support and further on the use of a gap of 1/64 of an inch between the surface of the rotor and the adjacent stationary electrodes deposited on the inner wall of envelope 10.

In connection with FIGURE 5, it should be noted that in order to avoid interaction between the different condenser pairs involved in supporting the rotor 202 it is important that all potentials supplied to each electrode pair be center grounded to a common ground point. The rotor will then assume a potential equal to the potential of the common ground point and there will be no cross coupling of sensing or supporting voltages from one system to another. While the supporting voltages were described as being low frequency A.C., for example, in the order of 400 cycles per second, it is possible to use direct current potentials for supporting rotor 202. There is, of course, a greater problem of producing and servo controlling the high supporting potentials required if they are of the direct current type. The electrostatic supporting scheme used in this invention is considered superior to the magnetic scheme in another respect, namely in its resistance to high acceleration forces and vibration, for in this system the reaction time of the servo and other controlling networks is much faster than it would be with an electromagnetic supporting scheme.

In connection with the ability of this system to resist and correct for high accelerating forces, it should be noted that these characteristics make the system adaptable for use as an accelerometer. A voltage indicating acceleration may be derived across condenser 79 in the integrating network comprising condenser 79 and resistor 80.

While it has been indicated that it is desirable to maintain sphericity of rotor 202, it should be noted that the distortion which may result from centrifugal forces when rotor 202 is turning at 80,000 r.p.m. is a symmetrical distortion and the rotor still is a figure of revolution around its axis of rotation. If the supporting fields form a pattern symmetrical about an axis which coincides with the spin axis then, even in the presence of centrifugal distortion of the spherical surface, there is no parasitic torque developed.

The circuitry described in FIGURE 6 detects the position of the geometrical axis of rotor 202. It is desirable to know the direction of the angular momentum vector of rotor 202. These two directions do not necessarily coincide exactly, because the rotor may be turning about an axis slightly different from its geometrical axis. A freely rotating symmetrical body has the property that the geometrical axis precesses about the direction of the angular momentum vector. Simple calculations will show that the frequency of wobble as a result of such precessing will be relatively high, for the present rotor approximately 1940 cycles per second. If the time constant of the control loops is greater than 1/100 of a second, the relatively high frequency wobble or oscillation will be averaged out by the control loops. However, this wobble may be used to a desirable end, namely the speed of rotation of rotor 202 may be detected by measuring the frequency of this oscillation. The amplitude of the oscillation depends upon the original conditions in accelerating rotor 202 to speed, in particular how well the accelerating torque due to the rotating magnetic field from coils 700 and 701 was related to the rotor axis. This relation can be made very close by accurate placement of coils 700 and 701 on envelope 10. A wobble amplitude not in excess of 1' of arc may be effected. Calculations indicate that the heating of rotor 202 during the accelerating process may be easily kept within the desired limits.

Thus it may be seen that there has been provided by this invention a highly precise gyroscope and associated actuating and controlling systems which may be very helpfully applied to present day navigational problems.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A free gyro system including: a gyroscopic element, said gyroscopic element including a conductive rotor and an envelope surrounding said rotor, said envelope carrying a plurality of rotor supporting electrodes spaced from said rotor and a plurality of tilt sensing electrodes, first conductor means for applying supporting and position sensing potentials to said supporting electrodes, and second conductor means for applying tilt sensing potentials to said tilt sensing electrodes; insulating means for preventing short circuiting of said supporting and sensing electrodes by said rotor; a source of variable supporting potential connected to said first conductor means; a position sensing bridge having a first arm connected to certain of said supporting electrodes and having a second arm thereof connected to certain other of said supporting electrodes; a source of position sensing potential connected across one diagonal of said bridge; a first phase sensitive amplifier and detector connected across the remaining diagonal of said bridge; a tilt sensing bridge having a first arm connected between certain of said tilt sensing electrodes and a second arm connected across certain other of said tilt sensing electrodes; a source of tilt sensing potential connected across one diagonal of said bridge, and a second phase sensitive amplifier and detector connected across the remaining diagonal of said bridge; the output of said first phase sensitive amplifier and detector being coupled to said source of variable supporting potential to effect control thereof; a motor mechanically coupled to said envelope for effecting tilting thereof, said motor being electrically coupled to the output of said second phase sensitive amplifier and detector for controlling said motor in its tilting of said envelope.

2. A system according to claim 1 in which said envelope of said gyroscopic element is evacuated.

3. A system according to claim 1 in which said rotor of said gyroscopic element includes a spherical portion and a ring portion lying about the equator of said spherical portion.

4. A system according to claim 1 in which said tilt sensing and position sensing potentials are alternating current of high frequency.

5. A system according to claim 1 in which said supporting potentials are of the direct current type.

6. A system according to claim 1 in which said supporting potential is of a low frequency alternating type.

7. A free gyro system including: a gyroscopic element, said gyroscopic element including a conductive rotor and an envelope surrounding said rotor, said envelope carrying a plurality of rotor supporting electrodes spaced from said rotor and a plurality of tilt sensing electrodes; first conductor means for applying supporting and position sensing potentials to said supporting electrodes and second conductor means for applying tilt sensing potentials to said tilt sensing electrodes; insulating means for preventing short circuiting of said supporting and sensing electrodes by said conductive rotor; a source of variable supporting potential connected to said first conductor means; a position sensing bridge having a first arm connected to certain of said supporting electrodes and having a second arm thereof connected to certain other of said supporting electrodes; a source of position sensing potential connected across one diagonal of said bridge; a first A.C. amplifier and phase detector connected across the remaining diagonal of said bridge; a tilt sensing bridge having a first arm connected between certain of said tilt sensing electrodes and a second arm connected across certain other of said tilt sensing electrodes; a source of tilt sensing potential connected across one diagonal of said bridge, and a second A.C. amplifier and phase detector connected across the remaining diagonal of said bridge; the output of said first A.C. amplifier and phase detector being coupled to said source of variable supporting potential to effect control thereof; a motor mechanically coupled to said envelope for effecting tilting thereof, said motor being electrically coupled to the output of said second A.C. amplifier and phase detector for controlling said motor in its tilting of said envelope; and means for applying a rotating magnetic field to said rotor portion.

8. An accelerometer including: a gyroscopic element, said gyroscopic element including a conductive rotor and an envelope surrounding said rotor, said envelope carrying a plurality of rotor supporting electrodes spaced from said rotor and a plurality of tilt sensing electrodes; first conductor means for applying supporting and position sensing potentials to said supporting electrodes and second conductor means for applying tilt sensing potentials to said tilt sensing electrodes; insulating means for preventing short circuiting of said supporting and sensing electrodes by said conductive rotor; a source of variable supporting potential connected to said first connector means; a position sensing bridge having a first arm connected to certain of said supporting electrodes and having a second arm thereof connected to certain other of said supporting electrodes; a source of position sensing potential connected across one diagonal of said bridge; a first A.C. amplifier and phase detector connected across the remaining diagonal of said bridge; a tilt sensing bridge having a first arm connected between certain of said tilt sensing electrodes and a second arm connected across certain other of said tilt sensing electrodes; a source of tilt sensing potential connected across one diagonal of said bridge and a second A.C. amplifier and phase detector connected across the remaining diagonal of said bridge;

an integrating network; the output of said first A.C. amplifier and phase detector being coupled through said integrating network to said source of variable supporting potential to effect control thereof; and means for deriving from said integrating network a potential related to the translational acceleration of said gyroscopic element.

9. A free gyro system including a gyroscope having a nonmagnetic electrically conductive rotor and an envelope surrounding the rotor including a plurality of rotor supporting electrodes generally symmetrically disposed about and adjacent said rotor, and means for applying electrostatic supporting potentials between opposed pairs of said electrodes, for rotatably electrostatically supporting said rotor free from contact with said electrodes.

10. A free gyro system in accordance with claim 9, including means for applying rotating forces to said rotor.

11. A free gyro system in accordance with claim 9, in which said rotor has a generally spheroidal body and an equatorial rim protruding from its general body surface; and tilt-sensing electrodes carried by said envelope in proximity to said rim.

12. A free gyro system in accordance with claim 11, in which said envelope includes formations for supporting the rim of said rotor out of contact with said tilt-sensing electrodes to prevent short-circuiting thereof during periods of de-energization of the supporting electrodes.

References Cited in the file of this patent

UNITED STATES PATENTS

| | | |
|---|---|---|
| 1,589,039 | Anschutz-Kaempfe | June 15, 1926 |
| 1,986,807 | Gillmor | Jan. 8, 1935 |
| 2,377,175 | Peer | May 29, 1945 |
| 2,691,306 | Beams et al. | Oct. 12, 1954 |

FOREIGN PATENTS

| | | |
|---|---|---|
| 580,680 | Great Britain | Sept. 17, 1942 |
| 926,351 | France | Apr. 14, 1947 |